US009212732B2

United States Patent
Takahashi et al.

(10) Patent No.: US 9,212,732 B2
(45) Date of Patent: Dec. 15, 2015

(54) CONTINUOUSLY VARIABLE TRANSMISSION AND ITS HYDRAULIC PRESSURE CONTROL METHOD

(71) Applicants: JATCO LTD, Fuji-shi, Shizuoka (JP); NISSAN MOTOR CO., LTD., Yokohama-shi, Kanagawa (JP)

(72) Inventors: Seiichiro Takahashi, Isehara (JP); Takashi Eguchi, Machida (JP); Tomohiro Utagawa, Sagamihara (JP); Tomoyuki Mizuochi, Sagamihara (JP); Hisao Nobu, Hachioji (JP); Kenji Sakakibara, Sagamihara (JP); Takahiro Ikeda, Zama (JP); Masayuki Shimizu, Ayase (JP); Masami Sakai, Ebina (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/387,461

(22) PCT Filed: Feb. 21, 2013

(86) PCT No.: PCT/JP2013/054374
§ 371 (c)(1),
(2) Date: Sep. 23, 2014

(87) PCT Pub. No.: WO2013/145967
PCT Pub. Date: Oct. 3, 2013

(65) Prior Publication Data
US 2015/0080156 A1    Mar. 19, 2015

(30) Foreign Application Priority Data

Mar. 28, 2012  (JP) .................................. 2012-075020

(51) Int. Cl.
F16H 9/12 (2006.01)
F16H 61/662 (2006.01)
F16H 61/12 (2010.01)

(52) U.S. Cl.
CPC ................ *F16H 9/125* (2013.01); *F16H 61/12* (2013.01); *F16H 61/6624* (2013.01); *F16H 61/66259* (2013.01); *F16H 61/66272* (2013.01); *F16H 2061/1288* (2013.01)

(58) Field of Classification Search
None
See application file for complete search history.

(56) References Cited

U.S. PATENT DOCUMENTS 4,857,034 A * 8/1989 Kouno et al. .................... 474/28
6,338,694 B1 * 1/2002 Eguchi ............................ 477/39

(Continued)

FOREIGN PATENT DOCUMENTS

| JP | 64-32958 U | 3/1989 |
| JP | 05-099302 A | 4/1993 |
| JP | 2001-099280 A | 4/2001 |

(Continued)

*Primary Examiner* — Edwin A Young
(74) *Attorney, Agent, or Firm* — Foley & Lardner LLP

(57) ABSTRACT

A target primary pressure and a target secondary pressure are set based on a speed ratio, a target line pressure as a target value of a line pressure is set to be a value obtained by adding an offset amount, as a positive value, to either one having a higher value out of the target primary pressure and the target secondary pressure, in at least a cross-point region as a region where an absolute value of a deviation, obtained by subtracting the target primary pressure from the target secondary pressure, is smaller than a predetermined deviation, and a primary pressure, a secondary pressure, and the line pressure are controlled to be the target primary pressure, the target secondary pressure, and the target line pressure, respectively.

15 Claims, 8 Drawing Sheets

(56) References Cited

U.S. PATENT DOCUMENTS

| | | | |
|---|---|---|---|
| 2003/0158646 A1* | 8/2003 | Nishida et al. | 701/51 |
| 2005/0192153 A1 | 9/2005 | Jozaki et al. | |
| 2007/0117663 A1* | 5/2007 | Van Der Leest et al. | 474/8 |
| 2007/0232423 A1 | 10/2007 | Katou et al. | |
| 2011/0053718 A1* | 3/2011 | Nonomura et al. | 474/70 |

FOREIGN PATENT DOCUMENTS

| | | |
|---|---|---|
| JP | 2004-116740 A | 4/2004 |
| JP | 2007-100898 A | 4/2007 |
| JP | 2007-278498 A | 10/2007 |
| JP | 2010-043676 A | 2/2010 |
| JP | 2010-223281 A | 10/2010 |

\* cited by examiner

CONTINUOUSLY VARIABLE TRANSMISSION AND ITS HYDRAULIC PRESSURE CONTROL METHOD

TECHNICAL FIELD

The present invention relates to hydraulic pressure control of a continuously variable transmission.

BACKGROUND ART

The continuously variable transmission is formed by a primary pulley, a secondary pulley, and a belt wound between the pulleys. Shift is made by changing hydraulic pressures (a primary pressure and a secondary pressure) supplied to the respective pulleys to change widths of grooves of the respective pulleys.

JP2001-99280A discloses technology of setting a target primary pressure and a target secondary pressure, and setting a target line pressure, as a target value of a line pressure serving as an original pressure of the primary pressure and the secondary pressure, to be equal to either one having a higher value out of the target primary pressure and the target secondary pressure.

According to this technology, the line pressure is not increased more than necessary relative to the primary pressure and the secondary pressure. This makes it possible to reduce a load of an oil pump and to improve fuel efficiency of a vehicle.

SUMMARY OF INVENTION

However, according to the above-described configuration, in which the target line pressure is set to be equal to either one having the higher value out of the target primary pressure and the target secondary pressure, hunting of a speed ratio may be caused when the target primary pressure or the target secondary pressure exceeds the target line pressure, and when a failure in regulating the primary pressure or the secondary pressure is caused.

A mechanism of how the hunting of the speed ratio is caused is as follows. Here, the case where the target secondary pressure exceeds the target line pressure will be explained with reference to FIG. 10.

The following is the assumption at a time ta.

An actual line pressure PL is lower than a target line pressure tPL due to variations in a hydraulic pressure.

A target secondary pressure tPsec has the same value as the target line pressure tPL, but exceeds the actual line pressure PL.

As a result of this, a secondary pressure regulating valve for regulating a secondary pressure Psec by using the actual line pressure PL as the original pressure makes a stroke in the direction of increasing the secondary pressure Psec, but the target secondary pressure tPsec cannot be realized, and thus, the secondary pressure regulating valve has a control position that is deviated from the normal control position, and enters a pressure regulation failure state in which the actual line pressure PL supplied to the secondary pressure regulating valve is made as the secondary pressure Psec without any change.

A target primary pressure tPpri and the target secondary pressure tPsec are set by referring to a table illustrated in FIG. 3. The target line pressure tPL is set as the one having the higher value out of the target primary pressure tPpri and the target secondary pressure tPsec.

Under this state, the target primary pressure tPpri and the target secondary pressure tPsec becomes equal to each other, that is, a cross-point is made (time ta), and when the target primary pressure tPpri exceeds the target secondary pressure tPsec, the target line pressure tPL increases along with the increase of the target primary pressure tPpri, and the line pressure PL increases (time ta and thereafter).

As the secondary pressure regulating valve is in the pressure regulation failure state, the secondary pressure Psec follows the increase of the line pressure PL and increases until the pressure regulation failure state of the secondary pressure regulating valve is resolved (time ta and thereafter).

As a result of this, the speed ratio changes to the lower side than the target speed ratio, and the target primary pressure tPpri is increased by speed ratio feedback control that brings the speed ratio closer to the target speed ratio, so that the primary pressure Ppri increases further (time ta and thereafter).

When the actual line pressure PL increases along with the increase of the target primary pressure tPri at a time tb, the control position of the secondary pressure regulating valve returns to the normal control position, and the pressure regulation failure state of the secondary pressure regulating valve is resolved. This causes the secondary pressure Psec to reduce rapidly and the speed ratio to change to the higher side rapidly.

As the speed ratio changes to the higher side rapidly so as to follow the target speed ratio, the target primary pressure tPpri is reduced. When the target primary pressure tPpri reduces, the target line pressure tPL reduces, and the line pressure PL reduces (time tc).

After the time ta, that is, after the cross-point, three pressures, that is, the primary pressure Ppri, the secondary pressure Psec, and the actual line pressure PL fluctuate near the same value with the same tendency. This causes the hydraulic pressure control to become unstable and occurrence of the hunting of the speed ratio.

An object of the present invention is to avoid the hunting of the speed ratio.

According to an aspect of the present invention, provided is a continuously variable transmission that includes a primary pulley, a secondary pulley, a power transmission member wound between the pulleys, and a shift control hydraulic circuit for regulating a primary pressure supplied to the primary pulley and a secondary pressure supplied to the secondary pulley by using a line pressure as an original pressure, and that shifts by changing the primary pressure and the secondary pressure to change widths of grooves of the pulleys, the continuously variable transmission including means for setting a target pulley pressure that sets a target primary pressure as a target value of the primary pressure and a target secondary pressure as a target value of the secondary pressure, based on a speed ratio, and means for setting a target line pressure that sets the target line pressure as a target value of the line pressure to be a value obtained by adding an offset amount, as a positive value, to either one having a higher value out of the target primary pressure and the target secondary pressure, in at least a cross-point region as a region where an absolute value of a deviation, obtained by subtracting the target primary pressure from the target secondary pressure, is smaller than a predetermined deviation, in which the shift control hydraulic circuit controls the primary pressure, the secondary pressure, and the line pressure to be the target primary pressure, the target secondary pressure, and the target line pressure, respectively.

According to another aspect of the present invention, provided is a hydraulic pressure control method in a continuously variable transmission that includes a primary pulley, a secondary pulley, a power transmission member wound between the pulleys, and a shift control hydraulic circuit for regulating a primary pressure supplied to the primary pulley and a secondary pressure supplied to the secondary pulley by using a line pressure as an original pressure, and that shifts by changing the primary pressure and the secondary pressure to change widths of grooves of the pulleys, the hydraulic pressure control method including setting a target primary pressure as a target value of the primary pressure and a target secondary pressure as a target value of the secondary pressure, based on a speed ratio, setting a target line pressure as a target value of the line pressure to be a value obtained by adding an offset amount, as a positive value, to either one having a higher value out of the target primary pressure and the target secondary pressure, in at least a cross-point region as a region where an absolute value of a deviation, obtained by subtracting the target primary pressure from the target secondary pressure, is smaller than a predetermined deviation, and controlling the primary pressure, the secondary pressure, and the line pressure to be the target primary pressure, the target secondary pressure, and the target line pressure, respectively.

According to these aspects, it is possible to prevent the three pressures, that is, the primary pressure, the secondary pressure, and the line pressure, from changing near the same value, and to prevent the hunting of the speed ratio.

Embodiments and advantages of the present invention will be explained in detail with reference to the attached drawings.

DESCRIPTION OF EMBODIMENTS

<First Embodiment>

Figure 1:
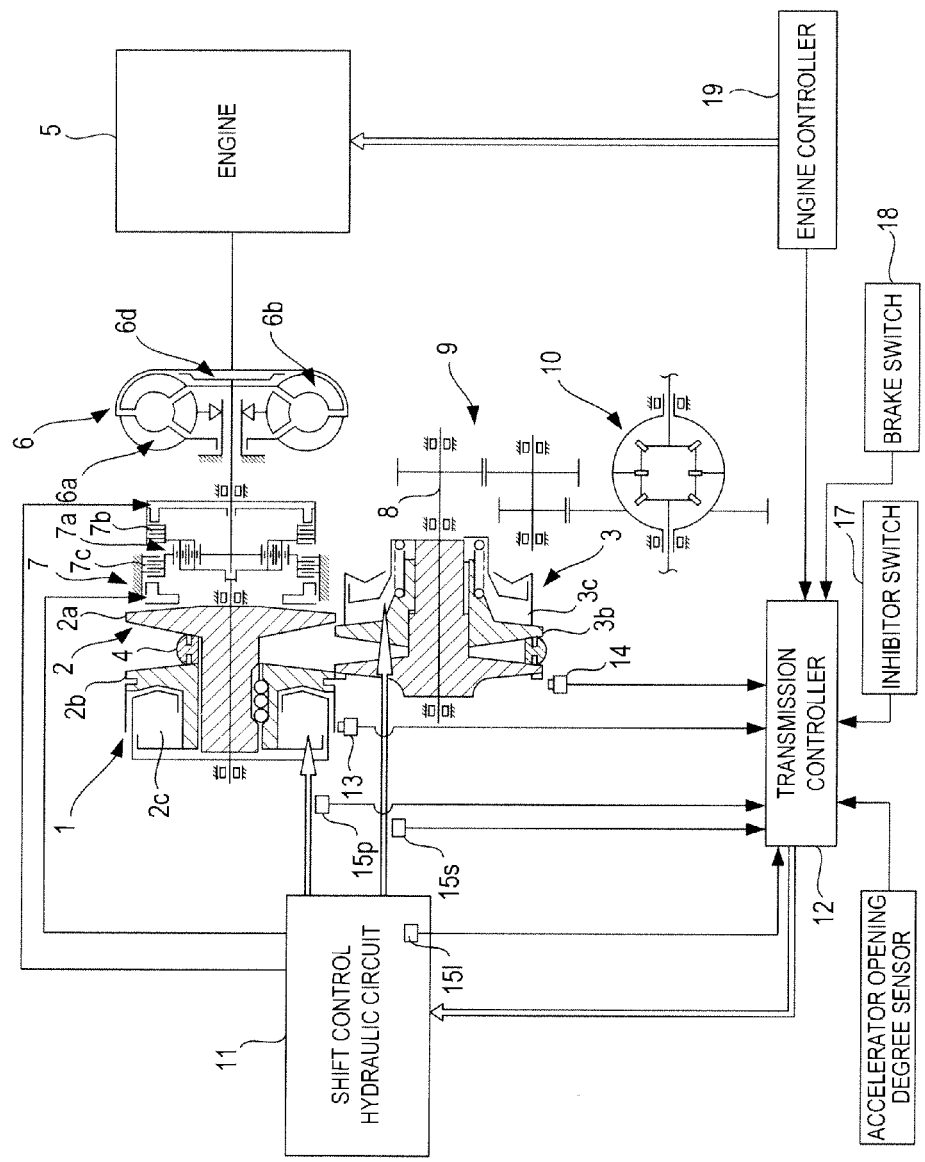
FIG. 1 is a schematic block diagram of a continuously variable transmission.

FIG. 1 illustrates a schematic configuration of a continuously variable transmission (hereinafter referred to as a "CVT") 1. A primary pulley 2 and a secondary pulley 3 are arranged so that grooves of the pulleys 2 and 3 are aligned, and a belt 4 is wound between the grooves of the pulleys 2 and 3. An engine 5 is arranged coaxially with the primary pulley 2 and, between the engine 5 and the primary pulley 2, a torque converter 6 and a forward/reverse movement switching mechanism 7 are provided from the engine 5 side.

The torque converter 6 is provided with a pump impeller 6a that is coupled to an output shaft of the engine 5, a turbine runner 6b that is coupled to an input shaft of the forward/reverse movement switching mechanism 7, a stator 6c, and a lock-up clutch 6d.

The forward/reverse movement switching mechanism 7 has a double pinion planetary gear train 7a as its main component, and its sun gear and its carrier are connected to the turbine runner 6b of the torque converter 6 and the primary pulley 2, respectively. The forward/reverse movement switching mechanism 7 is further provided with a start clutch 7b that directly connects the sun gear and the carrier of the double pinion planetary gear train 7a, and a reverse brake 7c that fixes a ring gear. When the start clutch 7b is engaged, input rotation that is transmitted from the engine 5 via the torque converter 6 is transmitted to the primary pulley 2 without any change, and when the reverse brake 7c is engaged, the input rotation that is transmitted from the engine 5 via the torque converter 6 is reversed and transmitted to the primary pulley 2.

Rotation of the primary pulley 2 is transmitted to the secondary pulley 3 via the belt 4, and rotation of the secondary pulley 3 is transmitted via an output shaft 8, a gear train 9, and a differential gear device 10 to a not-illustrated drive wheel.

In order to allow a speed ratio between the primary pulley 2 and the secondary pulley 3 to be changeable during the above-described power transmission, conical plates on one side are made as fixed conical plates 2a and 3a, and conical plates 2b and 3b on the other side are made as movable conical plates that can be displaced in the axis direction, the conical plates forming the grooves of the primary pulley 2 and the secondary pulley 3.

A primary pressure Ppri and a secondary pressure Psec, generated by using a line pressure PL as an original pressure, are supplied to a primary pulley chamber 2c and a secondary pulley chamber 3c, so as to bias the movable conical plates 2b and 3b toward the fixed conical plates 2a and 3a. Thereby, the belt 4 is frictionally engaged with the conical plates, and the power is transmitted between the primary pulley 2 and the secondary pulley 3.

A shift is made by changing the widths of the grooves of the pulleys 2 and 3 by a differential pressure between the primary pressure Ppri and the secondary pressure Psec, and by continuously changing winding circular arc diameters of the belt 4 with respect to the pulleys 2 and 3.

The primary pressure Ppri and the secondary pressure Psec are controlled by a shift control hydraulic circuit 11, together with hydraulic pressures supplied to the start clutch 7b that is engaged when a forward travel range is selected and to the reverse brake 7c that is engaged when a reverse travel range is selected. The shift control hydraulic circuit 11 performs the control in response to a signal from a transmission controller 12.

A signal from an input rotation speed sensor 13 that detects an actual input rotation speed Nin of the CVT 1, a signal from a vehicle speed sensor 14 that detects an output rotation speed of the CVT 1, that is, a vehicle speed VSP, a signal from a primary pressure sensor 15p that detects the primary pressure Ppri, a signal from a secondary pressure sensor 15s that detects the secondary pressure Psec, a signal from a line pressure sensor 15l that detects the line pressure PL, a signal from an accelerator opening degree sensor 16 that detects an accelerator opening degree APO, a selected range signal from an inhibitor switch 17 that detects a select lever position, a signal from a brake switch 18 that detects whether a brake pedal is depressed or not, and a signal about an operation state of the engine 5 from an engine controller 19 that controls the engine 5 (engine rotation speed Ne, engine torque, fuel injection time, cooling water temperature TMPe and the like) are inputted to the transmission controller 12.

Figure 2:
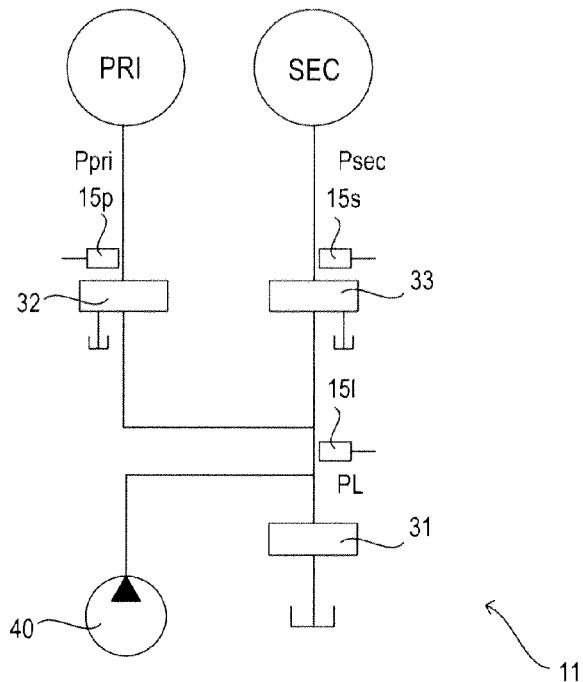
FIG. 2 is a schematic block diagram of a shift control hydraulic circuit.

FIG. 2 illustrates a schematic configuration of the shift control hydraulic circuit 11.

The shift control hydraulic circuit 11 is provided with an oil pump 40, a line pressure regulating valve 31, a primary pressure regulating valve 32, and a secondary pressure regulating valve 33.

The oil pump 40 is driven by power of the engine 5 or a not-illustrated motor.

The line pressure regulating valve 31 is a pressure reducing valve that drains a part of a discharge pressure of the oil pump 40 and reduces the pressure, so as to adjust the line pressure PL to be a target line pressure tPL. A method of setting the target line pressure tPL will be described later.

The primary pressure regulating valve 32 and the secondary pressure regulating valve 33 are the pressure reducing valves that drain a part of the line pressure PL and reduce the pressure, by using the line pressure PL as the original pressure, so as to adjust the primary pressure Ppri and the secondary pressure Psec to be a target primary pressure tPpri and a target secondary pressure tPsec, respectively. A method of setting the target primary pressure tPpri and the target secondary pressure tPsec will be described later.

Under the situation where the target primary pressure tPpri exceeds the target line pressure, the primary pressure regulating valve 32 has a control position that is deviated from the normal control position, and enters a pressure regulation failure state in which the line pressure PL is outputted as the primary pressure Ppri without any change. This also applies to the secondary pressure regulating valve 33.

Figure 3:
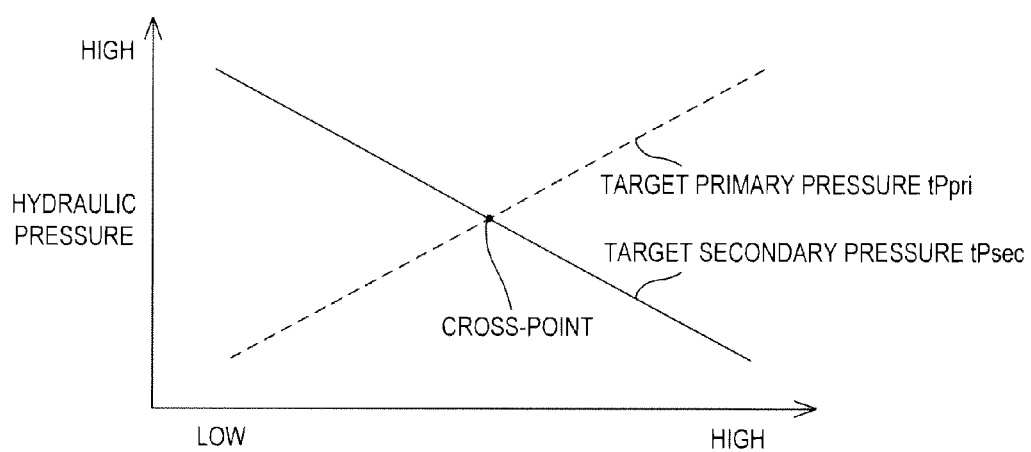
FIG. 3 is a table for setting a target primary pressure and a target secondary pressure.

FIG. 3 is a table for setting the target primary pressure tPpri and the target secondary pressure tPsec.

This table is prepared based on the primary pressure Ppri and the secondary pressure Psec that are required for maintaining the speed ratio of the CVT 1. The target primary pressure tPpri and the target secondary pressure tPsec are set by referring to the table illustrated in FIG. 3.

In the following explanation, the point where the target primary pressure tPpri and the target secondary pressure tPsec are equal to each other is referred to as a "cross-point".

Figure 4:
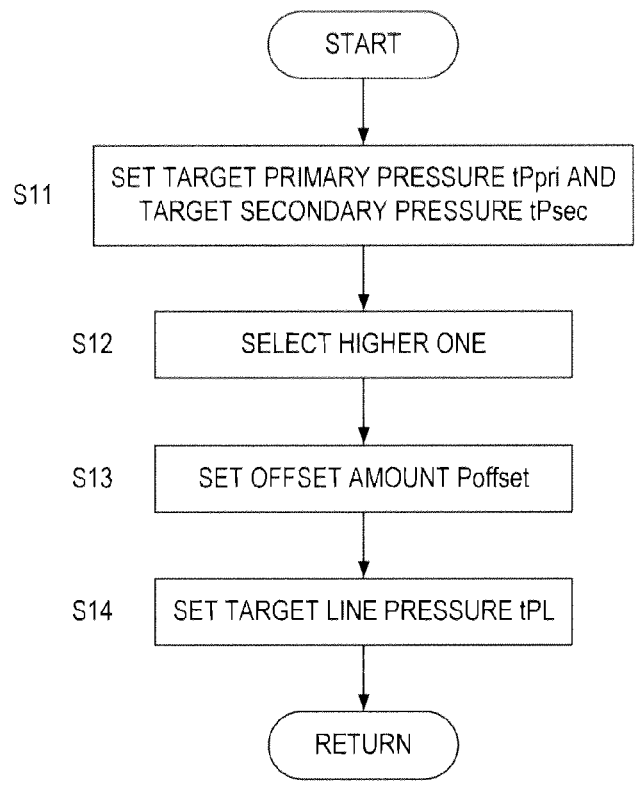
FIG. 4 is a flowchart illustrating processing for setting a target line pressure.

FIG. 4 is a flowchart illustrating the processing for setting the target line pressure tPL. The subject to execute the processing is the transmission controller 12.

A method of setting the target line pressure tPL will be explained with reference to this flowchart. First, the target primary pressure tPpri and the target secondary pressure tPsec are set by referring to the table illustrated in FIG. 3 (S11).

Next, the one having a higher value is selected from the target primary pressure tPpri and the target secondary pressure tPsec (S12).

Figure 5:
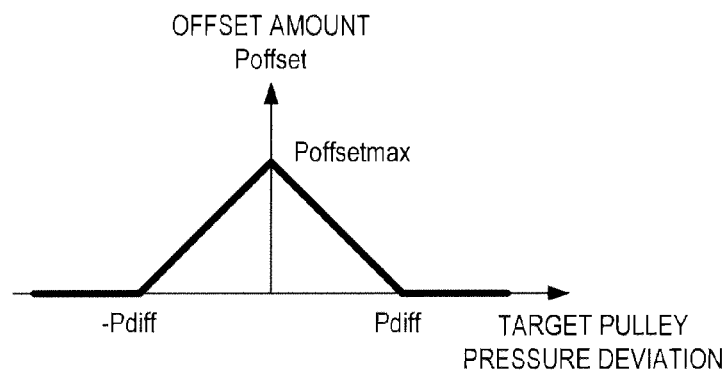
FIG. 5 is a table for setting an offset amount.

Then, an offset amount Poffset is set by referring to a table illustrated in FIG. 5, based on a deviation obtained by subtracting the target primary pressure tPpri from the target secondary pressure tPsec (hereinafter referred to as a "target pulley pressure deviation") (S13).

The offset amount Poffset is set to be zero when an absolute value of the target pulley pressure deviation is greater than Pdiff. However, when the absolute value of the target pulley pressure deviation becomes smaller than a predetermined deviation Pdiff, the offset amount Poffset is set to have a greater value as the absolute value of the target pulley pressure deviation becomes smaller. The offset amount Poffset is set to have a maximum value Poffsetmax when the target pulley pressure deviation is zero.

Thereby, the offset amount Poffset is set to have a positive value in the region where the absolute value of the target pulley pressure deviation is smaller than the predetermined deviation Pdiff (hereinafter referred to as a "cross-point region").

The target line pressure tPL is set as a value obtained by adding the offset amount Poffset that is set in the S13 to the value selected in the S12 (S14).

In the following explanation, adding the offset amount Poffset to the value selected in the S12 and setting the target line pressure tPL having the value greater than the value selected in the S12 are expressed as "the target line pressure tPL is allowed to offset".

Figure 6:
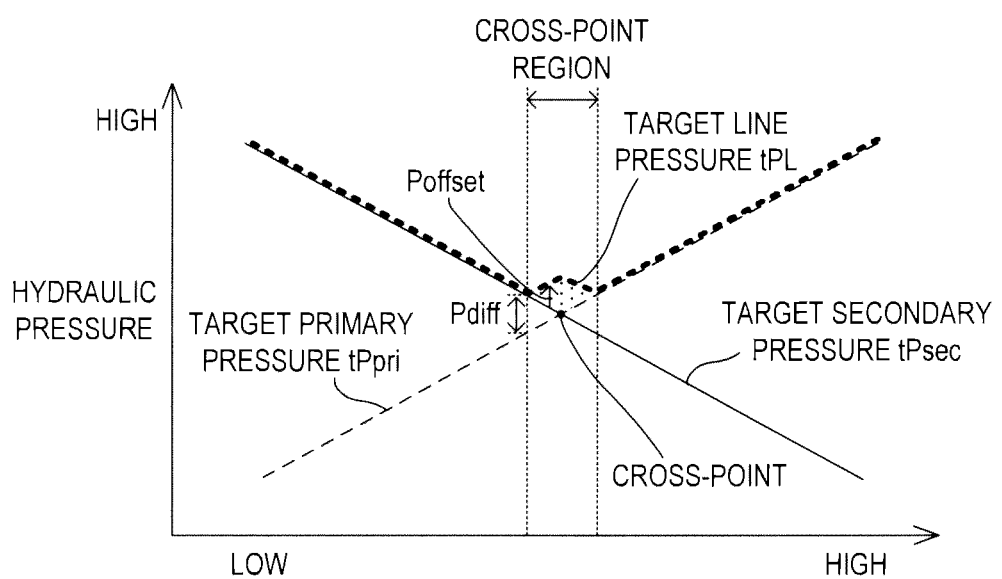
FIG. 6 is a view illustrating the offset target line pressure.

FIG. 6 illustrates the target line pressure tPL that is set like this.

Outside the cross-point region, the offset amount Poffset is set to be zero, and therefore, the target line pressure tPL is set to have the value equal to the one having the higher value out of the target primary pressure tPpri and the target secondary pressure tPsec. Namely, the offset from the target primary pressure tPpri and the target secondary pressure tPsec are not allowed.

Meanwhile, in the cross-point region, the target line pressure tPL is set to have the value obtained by adding the offset amount Poffset, as the positive value, to the one having the higher value out of the target primary pressure tPpri and the target secondary pressure tPsec.

According to the first embodiment, the setting of the target line pressure tPL is made like this, and the transmission controller 12 controls the line pressure regulating valve 31 so that the line pressure PL becomes thus-set target line pressure tPL.

Next, the operation and effect of the first embodiment will be explained.

According to the first embodiment, the target line pressure tPL in the cross-point region is allowed to offset as described above. Thereby, it is possible to prevent hunting of the speed ratio, even when the actual line pressure PL is lower than the target line pressure tPL due to variations in the hydraulic pressure, the target primary pressure tPpri or the target secondary pressure tPsec exceeds the actual line pressure PL, and a failure in regulating the primary pressure Ppri or the secondary pressure Psec is caused.

Figure 7:
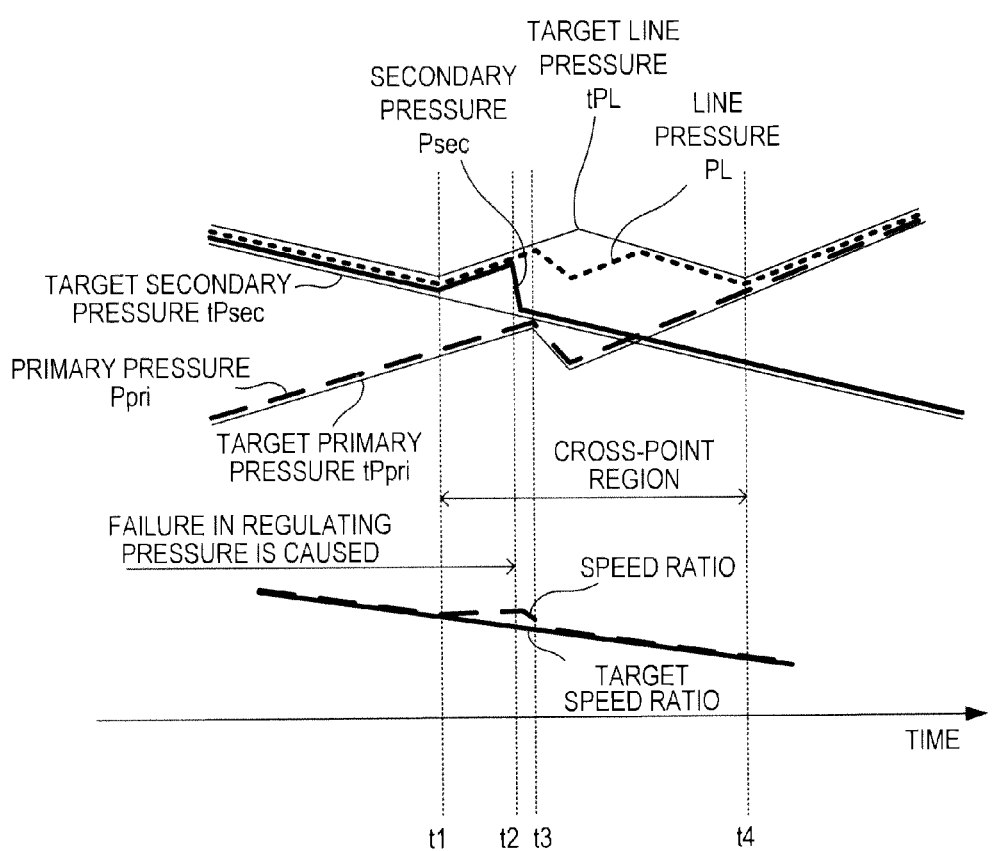
FIG. 7 is a time chart for explaining operation and effect of a first embodiment.

A mechanism to suppress the hunting of the speed ratio is as follows. Here, the case where the target secondary pressure tPsec exceeds the actual line pressure PL will be explained with reference to FIG. 7.

As a prerequisite, it is supposed that the target secondary pressure tPsec exceeds the actual line pressure PL and a failure in regulating the secondary pressure Psec is caused at a time t1.

At the time t1 when the cross-point region starts, the actual line pressure PL increases as the target line pressure tPL is increased.

As the secondary pressure regulating valve 33 is in the pressure regulation failure state, the secondary pressure Psec increases along with the actual line pressure PL, when the actual line pressure PL increases, until the failure in regulating the pressure is resolved (times t1 to t2).

Accordingly, the speed ratio changes to the lower side than the target speed ratio. Thereby, the target primary pressure tPpri increases so as to bring the speed ratio closer to the target speed ratio, and the primary pressure Ppri increases (times t1 to t2).

When the actual line pressure PL increases as the target line pressure tPL increases at the time t2, the control position of the secondary pressure regulating valve returns to the normal control position, and the pressure regulation failure state of the secondary pressure regulating valve 33 is resolved. Then, the secondary pressure Psec rapidly reduces and the speed ratio changes to the higher side rapidly.

In response to the rapid change of the speed ratio to the higher side, the target primary pressure tPpri is reduced. When the target primary pressure tPpri is reduced, the primary pressure Ppri reduces, but the actual line pressure PL is adjusted to be higher than the primary pressure Ppri and the secondary pressure Psec (time t3 and thereafter).

Then, the target primary pressure tPpri increases, the target secondary pressure tPsec reduces, and the actual line pressure PL fluctuates while having a value higher than the target primary pressure tPpri and the target secondary pressure tPsec, and becomes equal to the target primary pressure tPpri (time t4 and thereafter).

Thus, according to the first embodiment, the target line pressure tPL is allowed to offset in the vicinity of the cross-point. The offset of the target line pressure tPL makes it possible to prevent the respective hydraulic pressures from fluctuating near the same value with the same tendency, even though the actual line pressure PL is lower than the secondary pressure Psec, and the three pressures, that is, the primary pressure Ppri, the secondary pressure Psec, and the actual line pressure PL, fluctuate because of the failure in regulating the secondary pressure regulating valve.

Therefore, according to the first embodiment, it is possible to avoid the unstable hydraulic pressure control that is caused when the respective hydraulic pressures fluctuate near the same value with the same tendency in the vicinity of the cross-point, and to avoid the hunting of the speed ratio.

Moreover, when the target line pressure tPL is allowed to offset in the region lower than the cross-point region, the speed ratio changes from the lower side to the higher side relatively quickly. This makes it possible to avoid the hunting of the speed ratio without fail even during up-shift, in which the hunting of the speed ratio may not be avoided only by the configuration of allowing the target line pressure tPL to offset in the cross-point region only, as the offset of the line pressure PL is not enough. In addition, as the target line pressure tPL is not allowed to offset in the region higher than the cross-point region, it is possible to respond to higher requirements for fuel efficiency in the speed ratio on the higher side.

<Second Embodiment>

Next, a second embodiment of the present invention will be explained.

According to the first embodiment, the target line pressure tPL is allowed to offset unconditionally in the cross-point region. On the contrary, according to the second embodiment, the target line pressure tPL is allowed to offset only when it is determined that the operation state is either in the up-shift or in coast-down (down-shift performed when an accelerator is off and a vehicle decelerates).

The offset of the target line pressure tPL is performed only during the up-shift because the hunting of the speed ratio is caused more frequently during the up-shift, in which the speed ratio changes from the lower side to the higher side relatively gently as the vehicle speed increases, and the three pressures, that is, the primary pressure Ppri, the secondary pressure Psec, and the line pressure PL, remain near the same value for a longer period of time.

In addition, the offset of the target line pressure tPL during the down-shift is performed only during the coast-down because the hunting of the speed ratio is caused more frequently during the coast-down, in which the speed ratio changes from the higher side to the lower side relatively gently as the vehicle speed decreases, and the three pressures, that is, the primary pressure Ppri, the secondary pressure Psec, and the line pressure PL, remain near the same value for a longer period of time.

Figure 8:
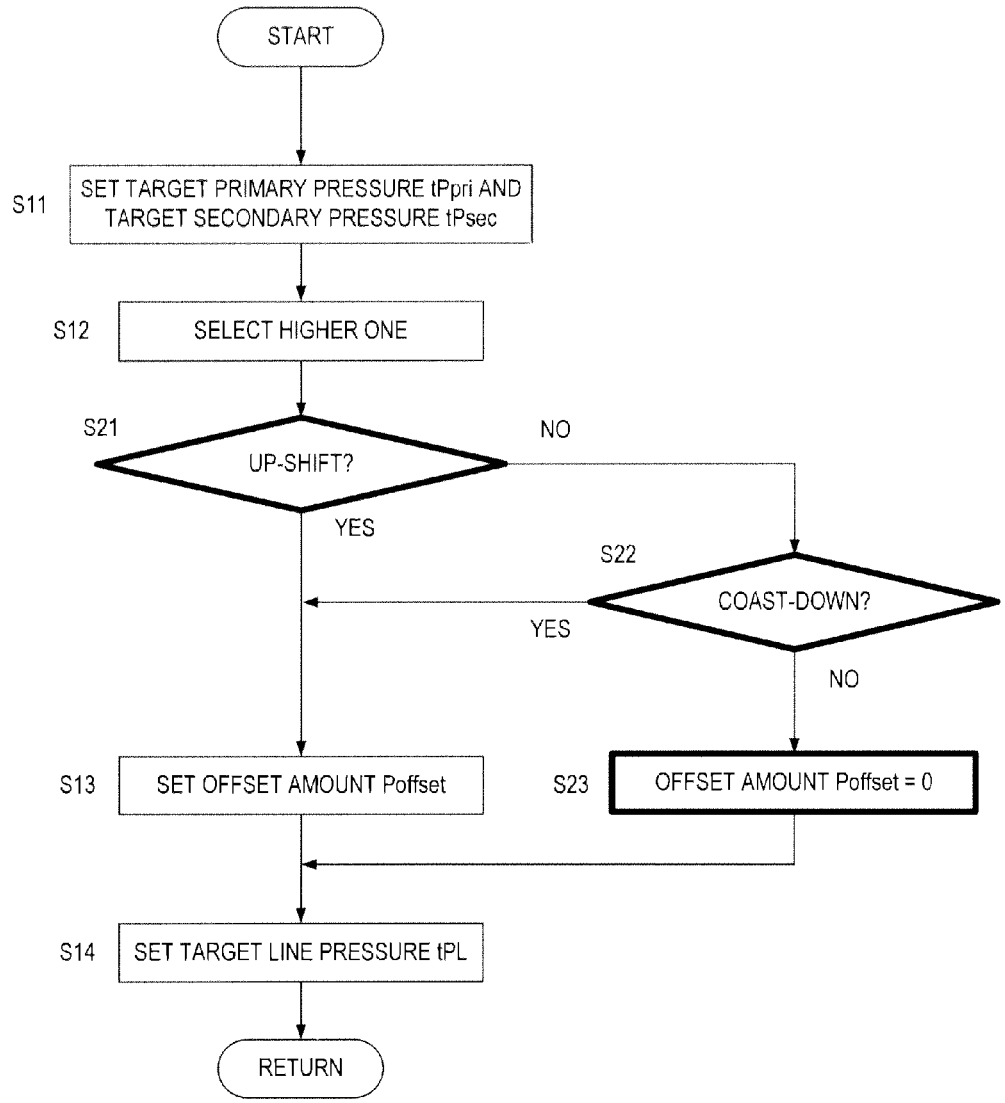
FIG. 8 is a flowchart illustrating the processing for setting the target line pressure according to a second embodiment.

FIG. 8 is a flowchart illustrating the processing for setting the target line pressure tPL. When compared with the processing of the first embodiment (FIG. 4), the processing of S21 for determining whether the up-shift is performed or not, the processing of S22 for determining whether the coast-down is performed or not (the determination of the coast-down is made when the down-shift is performed and the accelerator is off), and the processing of S23 for making the offset amount Poffset zero when it is determined neither the up-shift nor the coast-down is performed are added.

According to the second embodiment, the offset of the target line pressure tPL is not made even in the cross-point region, when the operation state is neither in the up-shift nor in the coast-down. Therefore, it is possible to prevent the unnecessary increase in the line pressure PL, and to improve the fuel efficiency.

<Third Embodiment>

Next, a third embodiment of the present invention will be explained.

According to the first embodiment, the target line pressure tPL is allowed to offset unconditionally in the cross-point region. On the contrary, according to the third embodiment, it is determined whether the failure in regulating the pressure is actually caused in the primary pressure Ppri or the secondary pressure Psec or not and, only when the failure in regulating the pressure is actually caused, the target line pressure tPL is allowed to offset.

Figure 9:
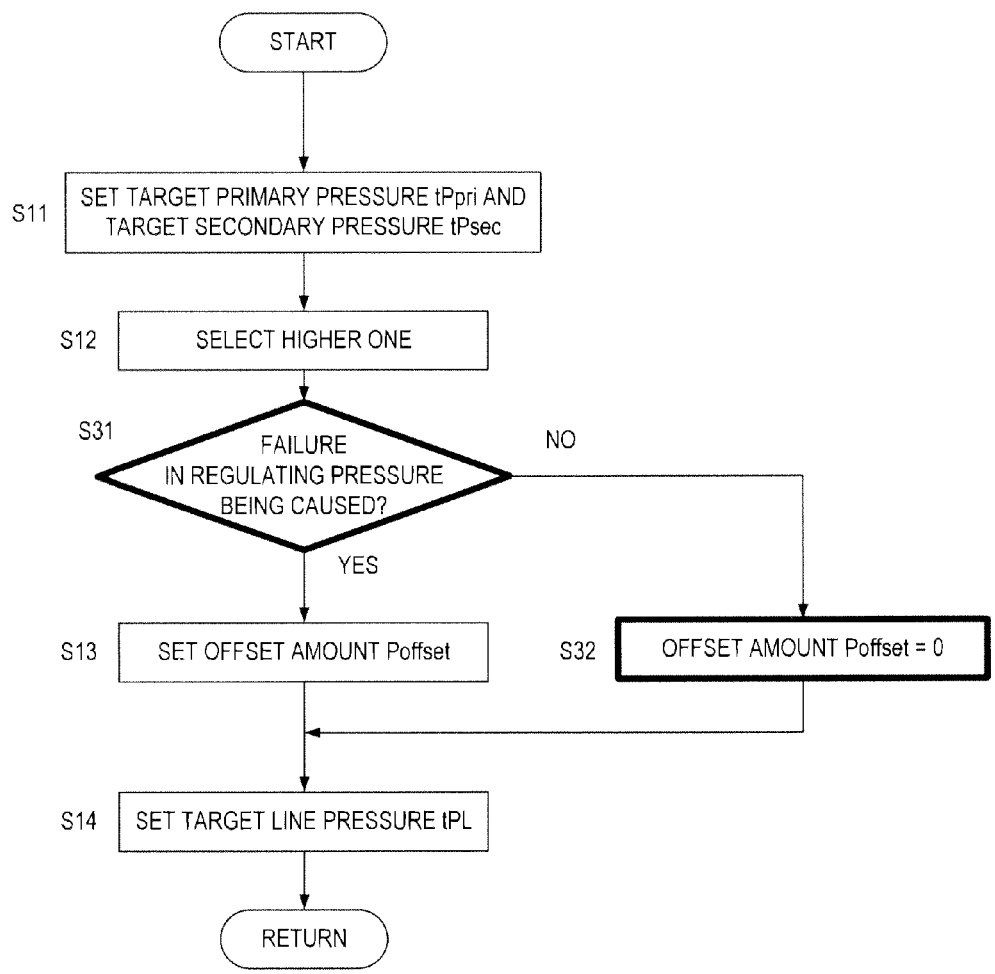
FIG. 9 is a flowchart illustrating the processing for setting the target line pressure according to a third embodiment.
Figure 10:
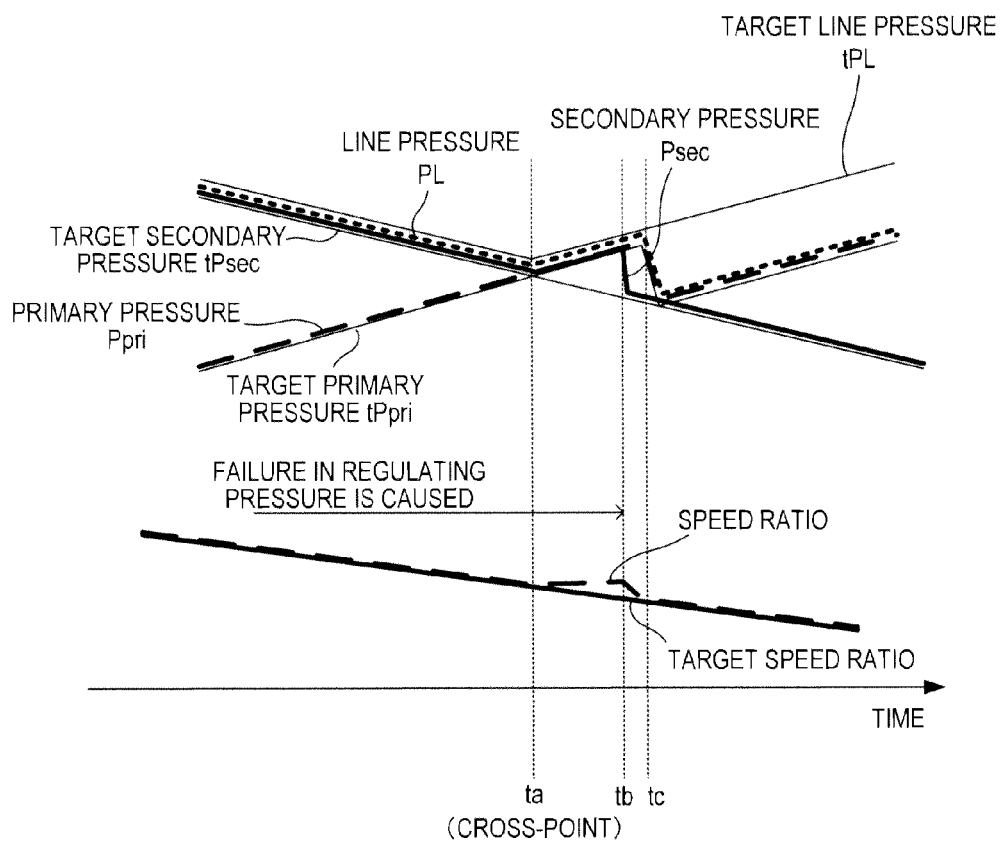
FIG. 10 is a time chart of a comparative example.

FIG. 9 is a flowchart illustrating the processing for setting the target line pressure tPL. When compared with the processing of the first embodiment (FIG. 4), the processing of S31 for determining whether the failure in regulating the pressure is caused or not, and the processing of S32 for making the offset amount zero when it is determined that the failure in regulating the pressure is not caused are added.

Whether the failure in regulating the pressure is caused or not can be determined based on magnitude relation between the target primary pressure tPpri or the target secondary pressure Psec and the actual line pressure PL. Specifically, when the target primary pressure tPpri or the target secondary pressure Psec is greater than the actual line pressure PL, it is possible to determine that the failure in regulating the pressure is caused.

The method for determining whether the failure in regulating the pressure is caused or not is not limited to the above, and the determination whether the failure in regulating the pressure is caused or not may be made by determining whether the target primary pressure tPpri is deviated from the primary pressure Ppri or not, or whether the target secondary pressure tPsec is deviated from the secondary pressure Psec or not.

According to the third embodiment, the offset of the target line pressure tPL is not made even in the cross-point region, when the failure in regulating the pressure is not caused. Therefore, it has such operations and effects that the unnecessary increase in the line pressure PL can be prevented, and the fuel efficiency can be improved.

The embodiments of the present invention have been explained thus far, but the above-described embodiments are only a part of the application examples of the present invention, and are not intended to limit the technical scope of the present invention to the concrete structures of the above-described embodiments.

For example, the above-described embodiments may be combined and implemented as required. For example, the second embodiment and the third embodiment may be combined and the target line pressure tPL may be allowed to offset during the up-shift or the coast-down and when the failure in regulating the pressure is caused.

Moreover, according to the first embodiment, the target line pressure tPL is allowed to offset by setting the offset value Poffset, having the positive value in the cross-point region, and adding the offset value Poffset to the one having the higher value out of the target primary pressure tPpri and the target secondary pressure tPsec. Namely, the offset value Poffset is set and added irrespective of whether it is in the cross-point region or not.

However, it may be first determined whether it is in the cross-point region or not, and the offset amount Poffset may be set and added only when it is determined that it is in the cross-point region, so as to allow the target line pressure tPL to offset.

The present application claims priority to Japanese Patent Application No. 2012-75020 filed in the Japan Patent Office on Mar. 28, 2012. The contents of this application are incorporated herein by reference in their entirety.

The invention claimed is:

1. A continuously variable transmission that includes a primary pulley, a secondary pulley, a power transmission member wound between the pulleys, and a shift control hydraulic circuit for regulating a primary pressure supplied to the primary pulley and a secondary pressure supplied to the secondary pulley by using a line pressure as an original pressure, and that shifts by changing the primary pressure and the secondary pressure and by changing widths of grooves of the pulleys, the continuously variable transmission comprising:
a unit configured to set a target pulley pressure that sets a target primary pressure as a target value of the primary pressure and a target secondary pressure as a target value of the secondary pressure, based on a speed ratio;
a unit configured to decide a cross-point region that decides the cross-point region as a region where an absolute value of a deviation, obtained by subtracting the target primary pressure from the target secondary pressure, is smaller than a predetermined deviation; and
a unit configured to set a target line pressure that sets the target line pressure as a target value of the line pressure to be a value obtained by adding an offset amount, as a positive value, to either one having a higher value out of the target primary pressure and the target secondary pressure,
wherein, when decision of the cross-point region is made or when decision of the cross-point region is made and in a region where the deviation increases to a positive side, the shift control hydraulic circuit controls the primary pressure, the secondary pressure, and the line pressure to be the target primary pressure, the target secondary pressure, and the target line pressure, respectively.

2. The continuously variable transmission according to claim 1, further comprising:
a unit configured to determine an operation state that determines whether the operation state is in up-shift or in coast-down or not,
wherein, only when it is determined that the operation state is in the up-shift or in the coast-down, the unit configured to set the target line pressure sets the target line pressure to be the value obtained by adding the offset amount, as the positive value, to either one having the higher value out of the target primary pressure and the target secondary pressure.

3. The continuously variable transmission according to claim 1, further comprising:
a unit configured to determine a failure in regulating a pressure that determines whether the failure in regulating the primary pressure or the secondary pressure is caused or not,
wherein, only when it is determined that the failure in regulating the pressure is caused, the unit configured to set the target line pressure sets the target line pressure to be the value obtained by adding the offset amount, as the positive value, to either one having the higher value out of the target primary pressure and the target secondary pressure.

4. The continuously variable transmission according to claim 3,
wherein the unit configured to determine the failure in regulating the pressure determines that the failure in regulating the pressure is caused when the target primary pressure or the target secondary pressure is higher than the target line pressure.

5. The continuously variable transmission according to claim 3,
wherein the unit configured to determine the failure in regulating the pressure determines that the failure in regulating the pressure is caused when the target primary pressure and the primary pressure are deviated from each other, or when the target secondary pressure and the secondary pressure are deviated from each other.

6. A hydraulic pressure control method in a continuously variable transmission that includes a primary pulley, a secondary pulley, a power transmission member wound between the pulleys, and a shift control hydraulic circuit for regulating a primary pressure supplied to the primary pulley and a secondary pressure supplied to the secondary pulley by using a line pressure as an original pressure, and that shifts by changing the primary pressure and the secondary pressure and by changing widths of grooves of the pulleys, the hydraulic pressure control method comprising:
setting a target primary pressure as a target value of the primary pressure and a target secondary pressure as a target value of the secondary pressure, based on a speed ratio;
deciding a cross-point region as a region where an absolute value of a deviation, obtained by subtracting the target primary pressure from the target secondary pressure, is smaller than a predetermined deviation;
setting a target line pressure as a target value of the line pressure to be a value obtained by adding an offset amount, as a positive value, to either one having a higher value out of the target primary pressure and the target secondary pressure, when decision of the cross-point region is made or when decision of the cross-point region is made and in a region where the deviation increases to a positive side; and
controlling the primary pressure, the secondary pressure, and the line pressure to be the target primary pressure, the target secondary pressure, and the target line pressure, respectively.

7. The hydraulic pressure control method according to claim 6, further comprising:
determining whether an operation state is in up-shift or in coast-down or not,
wherein, only when it is determined that the operation state is in the up-shift or in the coast-down, the target line pressure is set to be the value obtained by adding the offset amount, as the positive value, to either one having the higher value out of the target primary pressure and the target secondary pressure.

8. The hydraulic pressure control method according to claim 6, further comprising:

determining whether a failure in regulating the primary pressure or the secondary pressure is caused or not, wherein, only when it is determined that the failure in regulating the pressure is caused, the target line pressure is set to be the value obtained by adding the offset amount, as the positive value, to either one having the higher value out of the target primary pressure and the target secondary pressure.

9. The hydraulic pressure control method according to claim 8, wherein it is determined that the failure in regulating the pressure is caused when the target primary pressure or the target secondary pressure is higher than the target line pressure.

10. The hydraulic pressure control method according to claim 8, wherein it is determined that the failure in regulating the pressure is caused when the target primary pressure and the primary pressure are deviated from each other, or when the target secondary pressure and the secondary pressure are deviated from each other.

11. A continuously variable transmission that includes a primary pulley, a secondary pulley, a power transmission member wound between the pulleys, and a shift control hydraulic circuit for regulating a primary pressure supplied to the primary pulley and a secondary pressure supplied to the secondary pulley by using a line pressure as an original pressure, and that shifts by changing the primary pressure and the secondary pressure and by changing widths of grooves of the pulleys, the continuously variable transmission comprising:

means for setting a target pulley pressure that sets a target primary pressure as a target value of the primary pressure and a target secondary pressure as a target value of the secondary pressure, based on a speed ratio;

means for deciding a cross-point region that decides the cross-point region as a region where an absolute value of a deviation, obtained by subtracting the target primary pressure from the target secondary pressure, is smaller than a predetermined deviation; and means for setting a target line pressure that sets the target line pressure as a target value of the line pressure to be a value obtained by adding an offset amount, as a positive value, to either one having a higher value out of the target primary pressure and the target secondary pressure, wherein, when decision of the cross-point region is made or when decision of the cross-point region is made and in a region where the deviation increases to a positive side, the shift control hydraulic circuit controls the primary pressure, the secondary pressure, and the line pressure to be the target primary pressure, the target secondary pressure, and the target line pressure, respectively.

12. The continuously variable transmission according to claim 11, further comprising:

means for determining an operation state that determines whether the operation state is in up-shift or in coast-down or not, wherein, only when it is determined that the operation state is in the up-shift or in the coast-down, the means for setting the target line pressure sets the target line pressure to be the value obtained by adding the offset amount, as the positive value, to either one having the higher value out of the target primary pressure and the target secondary pressure.

13. The continuously variable transmission according to claim 11, further comprising:

means for determining a failure in regulating a pressure that determines whether the failure in regulating the primary pressure or the secondary pressure is caused or not, wherein, only when it is determined that the failure in regulating the pressure is caused, the means for setting the target line pressure sets the target line pressure to be the value obtained by adding the offset amount, as the positive value, to either one having the higher value out of the target primary pressure and the target secondary pressure.

14. The continuously variable transmission according to claim 13, wherein the means for determining the failure in regulating the pressure determines that the failure in regulating the pressure is caused when the target primary pressure or the target secondary pressure is higher than the target line pressure.

15. The continuously variable transmission according to claim 13, wherein the means for determining the failure in regulating the pressure determines that the failure in regulating the pressure is caused when the target primary pressure and the primary pressure are deviated from each other, or when the target secondary pressure and the secondary pressure are deviated from each other.

* * * * *